United States Patent
Anno et al.

(10) Patent No.: US 8,487,903 B2
(45) Date of Patent: Jul. 16, 2013

(54) DISPLAY DEVICE

(75) Inventors: Kouichi Anno, Mobara (JP); Shigeyuki Nishitani, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 530 days.

(21) Appl. No.: 12/719,084

(22) Filed: Mar. 8, 2010

(65) Prior Publication Data

US 2010/0231554 A1    Sep. 16, 2010

(30) Foreign Application Priority Data

Mar. 12, 2009 (JP) ................................. 2009-059446

(51) Int. Cl.
*G06F 3/045* (2006.01)

(52) U.S. Cl.
USPC ........... 345/174; 345/104; 345/156; 345/173; 178/18.01; 178/18.03; 178/18.05; 178/19.01; 463/37

(58) Field of Classification Search
USPC ............... 345/87–104, 156, 38, 50, 173–179; 178/18.01–18.09, 18.11, 19.01–19.07; 463/37
See application file for complete search history.

(56) References Cited

U.S. PATENT DOCUMENTS

| | | | |
|---|---|---|---|
| 2004/0101301 A1* | 5/2004 | Mitsu et al. | 398/33 |
| 2008/0180407 A1* | 7/2008 | Utsunomiya et al. | 345/174 |
| 2008/0180584 A1* | 7/2008 | Utsunomiya et al. | 349/12 |
| 2008/0297714 A1* | 12/2008 | Yanagawa et al. | 349/153 |

FOREIGN PATENT DOCUMENTS

| | | |
|---|---|---|
| JP | 2006-146895 | 6/2006 |
| JP | 2008-165435 | 7/2008 |

* cited by examiner

*Primary Examiner* — Lun-Yi Lao
*Assistant Examiner* — Insa Sadio
(74) *Attorney, Agent, or Firm* — Antonelli, Terry, Stout & Kraus, LLP.

(57) ABSTRACT

A display device incorporating a touch panel that can be made thinner than a conventional one and requires no countermeasure against misalignment in overlapping is provided by incorporating a touch panel. The display device incorporating a touch panel includes a display panel having a first substrate and a second substrate. The second substrate has a conductive light shielding film formed in a grid pattern on a surface on the opposite side from an observer. The conductive light shielding film is used as a touch panel electrode of electrostatic capacitive coupling system. The conductive light shielding film has a shape with four corners. The corners of the conductive light shielding film are connected to a touch position detection circuit. The display panel has four conductive members. The first substrate has four connecting portions each connected to each of the corners of the conductive light shielding film via each of the conductive members, four terminals connected to the touch position detection circuit, and wires each connecting each of the connecting portions with each of the terminals. The conductive member is a conductive bead.

8 Claims, 10 Drawing Sheets

DISPLAY DEVICE

CROSS-REFERENCE TO RELATED APPLICATION

The present application claims priority from Japanese application JP 2009-059446 filed on Mar. 12, 2009, the content of which is hereby incorporated by reference into this application.

BACKGROUND OF THE INVENTION

1. Field of the Invention

The present invention relates to a display device incorporating a touch panel and more particularly to a display device incorporating a touch panel equipped with a touch panel function of electrostatic capacitive coupling system and achieving high transmission.

2. Background Art

In recent years, a touch panel technique supporting a "human-friendly" graphical user interface has become important in the widespread use of mobile equipment.

As the touch panel technique, a touch panel of electrostatic capacitive coupling system has been known. In a general touch panel of electrostatic capacitive coupling system, a touch panel substrate in which a conductive coating (transparent conductive film) is applied on the surface of a glass substrate is disposed, and a finger touches the touch panel substrate, so that the position is detected.

The touch panel substrate is attached to the surface of the liquid crystal display panel, and a menu screen displayed on the liquid crystal display panel is touched by a finger, so that an operation according to the menu is performed. This liquid crystal display panel with a touch panel is known from JP-A-2006-146895, etc.

SUMMARY OF THE INVENTION

As described above, in the display panel with a touch panel, the touch panel is generally overlapped and used on a display region surface of a display panel that displays an image and character information. In a conventional display panel with a touch panel, the touch panel and the display panel are manufactured separately from each other and combined by overlapping, so that they are formed as a final product.

Therefore, in the conventional display panel with a touch panel, the touch panel and the display panel that are manufactured separately have to be stacked upon each other, which causes problems that the display panel with the touch panel is increased in thickness, and that a countermeasure against misalignment in overlapping is required when they are stacked upon each other.

The invention has been made to solve the problems in the related art, and it is an object of the invention to provide a display device incorporating a touch panel that can be made thinner than a conventional one and requires no countermeasure against misalignment in overlapping by incorporating a touch panel.

The above and other objects and novel features of the invention will be apparent from the description herein and the accompanying drawings.

Typical outlines of the invention disclosed herein will be descried briefly below.

As a light shielding film formed on a second substrate, a conductive light shielding film formed in a grid pattern is used. The conductive light shielding film is used as a touch panel electrode of electrostatic capacitive coupling system. The conductive light shielding film has a shape with four corners. A pulse-voltage-for-position-detection generating circuit supplies a pulse voltage for position detection to each of the four corners of the conductive light shielding film at different timings. A coordinate position computing circuit computes a touch position on the conductive light shielding film by an observer's finger based on a voltage output from, when the pulse voltage for position detection is supplied to one of the four corners of the conductive light shielding film, another corner on the same diagonal line as the corner to which the pulse voltage is supplied.

According to the invention, it is possible to provide a display device incorporating a touch panel that can be made thinner than a conventional one and requires no countermeasure against misalignment in overlapping by incorporating a touch panel.

DETAILED DESCRIPTION OF THE EMBODIMENTS

Figure 1A:
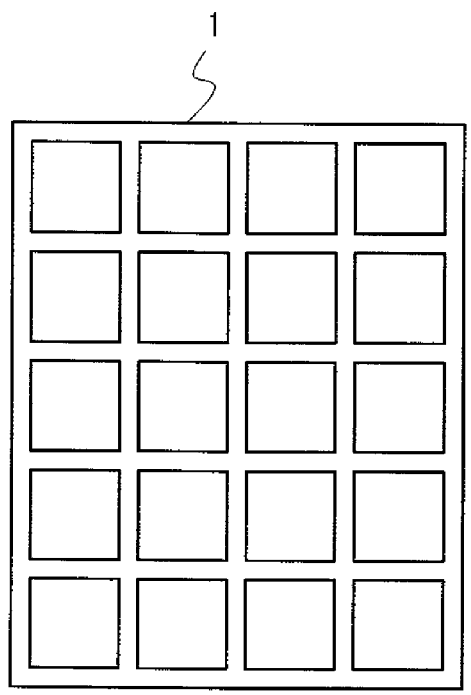
FIGS. 1A and 1B are explanatory views of the principle of position detection of a touch panel in a liquid crystal display device incorporating the touch panel according to the invention.

Hereinafter, an embodiment of the invention will be described in detail with reference to the drawings.

Throughout the drawings for explaining the embodiment, constituent elements having the same function are denoted by the same reference numerals, and the repetitive description thereof is omitted.

[Principle of Position Detection of Liquid Crystal Display Device Incorporating Touch Panel According to the Invention]

FIGS. 1A to 2E are explanatory views of the principle of position detection of a touch panel in a liquid crystal display device incorporating the touch panel according to the invention.

Figure 1B:
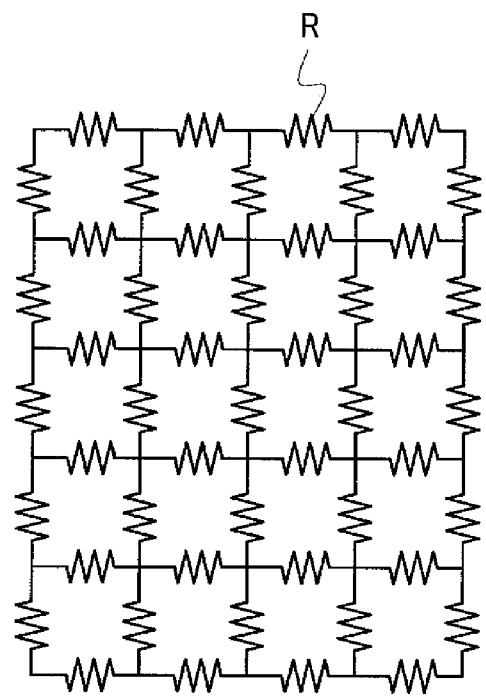

As shown in FIG. 1A, an equivalent circuit of a conductive member 1 having a grid pattern is a circuit in which resistive elements R are connected in a grid shape as shown in FIG. 1B.

Figure 2C:
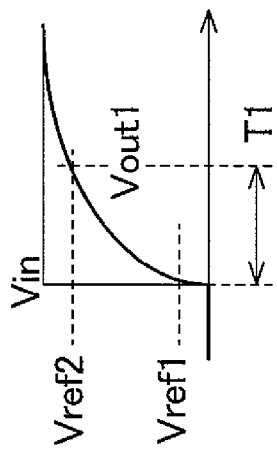
FIGS. 2A to 2E are explanatory views of the principle of position detection of the touch panel in the liquid crystal display device incorporating the touch panel according to the invention.
Figure 2E:
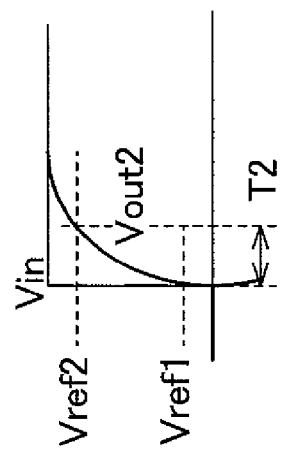
Figure 2B:
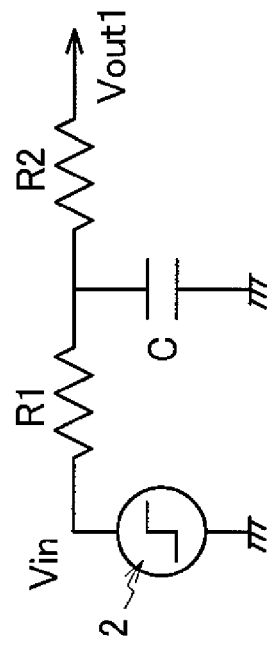
Figure 2D:
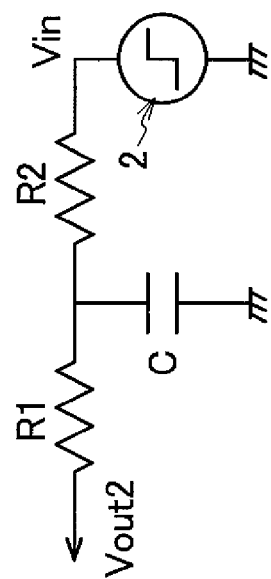
Figure 2A:
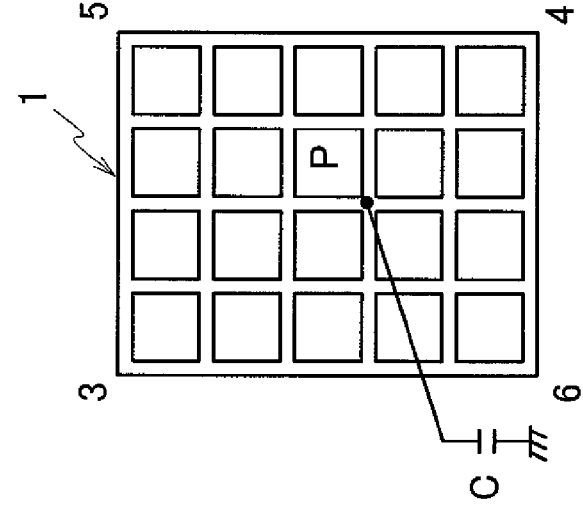

As shown in FIG. 2A, when an observer's finger touches a point P in FIG. 2A of the conductive member 1 having a grid pattern shown in FIG. 1A, a capacitive element C is inserted between the point P of the conductive member 1 having a grid pattern and a reference potential GND.

In this state, a pulse voltage Vin is supplied from a pulse voltage generating circuit 2 to a corner 3 among the four corners of the conductive member 1, and a rise time during which a pulse voltage output from a corner (corner on the same diagonal line) 4 facing the corner 3 of the conductive member 1 rises from a predetermined voltage Vref1 to a predetermined voltage Vref2 is measured. FIG. 23 shows an equivalent circuit of the conductive member 1 in this state, while FIG. 2C shows the rise time of the pulse voltage output from the corner 4 of the conductive member 1 at that time. In FIG. 2C, Vout1 denotes the pulse voltage output from the corner 4 of the conductive member 1, and T1 denotes the rise time.

Next, the pulse voltage Vin is supplied from the pulse voltage generating circuit 2 to the corner 4 of the conductive member 1, and a rise time during which the pulse voltage output from the corner 3 of the conductive member 1 rises from the predetermined voltage Vref1 to the predetermined voltage Vref2 is measured. FIG. 2D shows an equivalent circuit of the conductive member 1 in this state, while FIG. 2E shows the rise time of the pulse voltage output from the corner 3. In FIGS. 2B and 2D, R1 denotes an equivalent resistance between the corner 3 of the conductive member 1 having a grid pattern and the point P, and R2 denotes an equivalent resistance between the corner 4 of the conductive member 1 having a grid pattern and the point P. In FIG. 2E, Vout2 denotes the pulse voltage output from the corner 3 of the conductive member 1, and T2 denotes the rise time.

Next, the time difference T1-T2 between the times T1 and T2 is calculated. When R1>R2 is established, T1>T2 is established. When R1=R2 is established, T1=T2 is established. When R1<R2 is established, T1<T2 is established.

Accordingly, when the time difference T1-T2 is 0, the position touched by the observer's finger can be determined as the position of the center point (point at which two diagonal lines cross each other) of the conductive member 1 having a grid pattern.

When the time difference T1-T2 is a positive value, the position touched by the observer's finger can be determined as a position between the center point of the conductive member 1 having a grid pattern and the corner 4. As the positive value of the time difference T1-T2 becomes greater, the position touched by the observer's finger is nearer to the corner 4.

Similarly, when the time difference T1-T2 is a negative value, the position touched by the observer's finger can be determined as a position between the center point of the conductive member 1 having a grid pattern and the corner 3. As the negative value of the time difference T1-T2 becomes smaller, the position touched by the observer's finger is nearer to the corner 3.

By performing the above-described procedure on the diagonal corners 5 and 6 of the conductive member 1 having a grid pattern, the position on the touch panel touched by the observer's finger can be detected.

Embodiment

In general, a liquid crystal display panel is formed as follows: a first substrate (also referred to as TFT substrate or active matrix substrate) SUB1 on which pixel electrodes, thin film transistors, and the like are provided and a second substrate (also referred to as color filter substrate) SUB2 on which a light shielding film, color filters, and the like are formed are overlapped with each other with a predetermined gap; the substrates are bonded together with a sealing material formed in a frame shape near the periphery of the substrates; liquid crystal is filled and sealed inside the sealing material between the substrates from a liquid crystal filling port provided at a part of the sealing material; and a polarizer is attached to the outer surfaces of the substrates.

In this case, the light shielding film has a grid pattern. In the embodiment, a conductive light shielding film is used as the light shielding film; the conductive light shielding film is used as the conductive member 1 having a grid pattern; and a touch panel is incorporated into the liquid crystal display panel.

Figure 3:
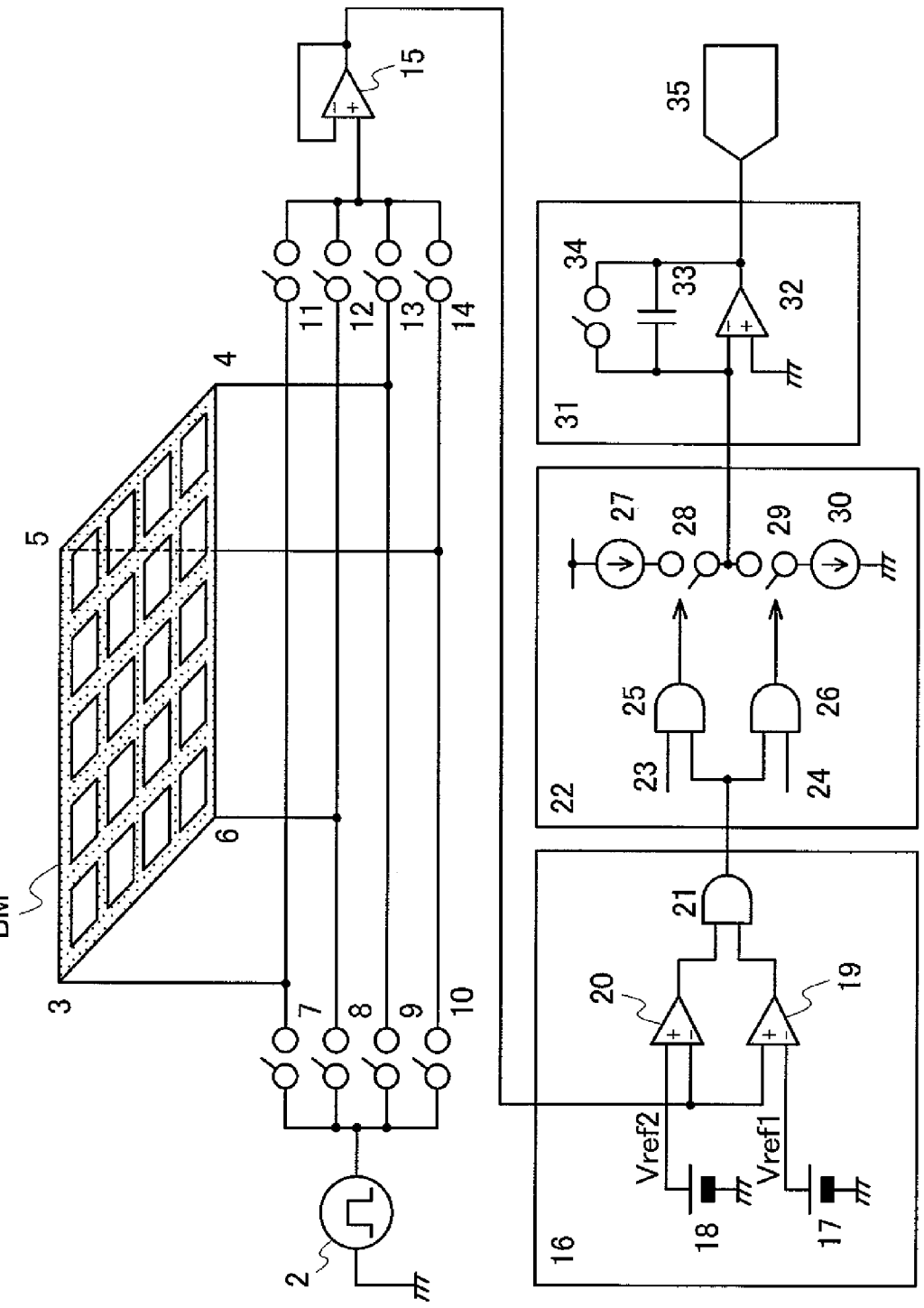
FIG. 3 shows a schematic configuration of a touch panel in a liquid crystal display device incorporating the touch panel according to an embodiment of the invention.

FIG. 3 shows a schematic configuration of a touch panel in a liquid crystal display device incorporating the touch panel according to the embodiment of the invention. FIGS. 4A to 4F are timing diagrams showing voltage waveforms of portions shown in FIG. 3. The pulse voltage generating circuit 2, switches 7 to 14, a buffer amplifier 15, a comparator circuit 16, a charge pump circuit 22, an integrator circuit 31, and an A/D converter 35, shown in FIG. 3, constitute a touch position detection circuit.

The corners 3, 4, 5, and 6 of the conductive light shielding film (also referred to as black matrix) BM having a grid pattern are connected to the pulse voltage generating circuit 2 via the switches 7 to 10 and connected to the buffer amplifier 15 via the switches 11 to 14.

For example, the switches 7 and 13 are turned on during a cycle F1 shown in FIG. 4A to supply a pulse voltage (refer to FIG. 4A) from the pulse voltage generating circuit 2 to the corner 3 of the light shielding film BM. A pulse voltage (refer to FIG. 4B) that is output from the corner 4 of the light shielding film BM and rises at a predetermined time constant is input to the comparator circuit 16 via the buffer amplifier 15. The buffer amplifier 15 increases the impedance on the buffer amplifier side as viewed from the corner 4 in order to prevent inflow of a current to the corner 4. If a current flows into the corner 4, the rise time of the pulse voltage output from the corner 4 of the light shielding film BM varies, which causes an error in detection of a position on the light shielding film BM.

The comparator circuit 16 converts the pulse voltage that is output from the corner 4 of the light shielding film BM and rises at the predetermined time constant into a signal having a first time duration (T1 in FIG. 4C).

The comparator circuit 16 includes a comparator 19 to which a reference voltage 17 of the voltage Vref1 is input, a comparator 20 to which a reference voltage 18 of the voltage Vref2 is input, and an AND circuit 21 that obtains the AND of the outputs of the comparator 19 and the comparator 20.

With the signal having the first time duration, a switch 28 of the charge pump circuit 22 is turned on (refer to FIG. 4D), and a current of a current source 27 is output to the integrator circuit 31.

According to the time duration (T1 in FIG. 4C) of the signal having the first time duration of the integrator circuit 31, a capacitor 33 connected between the inverting terminal and output terminal of an operational amplifier 32 constituting the integrator circuit 31 is charged. When the time duration of the signal having the first time duration is long, the amount of charge is large. When the time duration is short, the amount of charge is small.

The charge pump circuit 22 includes AND circuits 25 and 26. When a control signal 23 is high, the AND circuit 25 turns the switch 28 on with the output of the comparator circuit 16. When a control signal 24 is high, the AND circuit 26 turns a switch 29 on with the output of the comparator circuit 16.

Next, during a cycle F2 shown in FIG. 4A, the switches 9 and 11 are turned on to supply the pulse voltage (refer to FIG. 4A) from the pulse voltage generating circuit 2 to the corner 4 of the light shielding film BM. The pulse voltage (refer to FIG. 4B) that is output from the corner 3 of the light shielding film BM and falls at the predetermined time constant is input to the comparator circuit 16 via the buffer amplifier 15.

Figure 4:
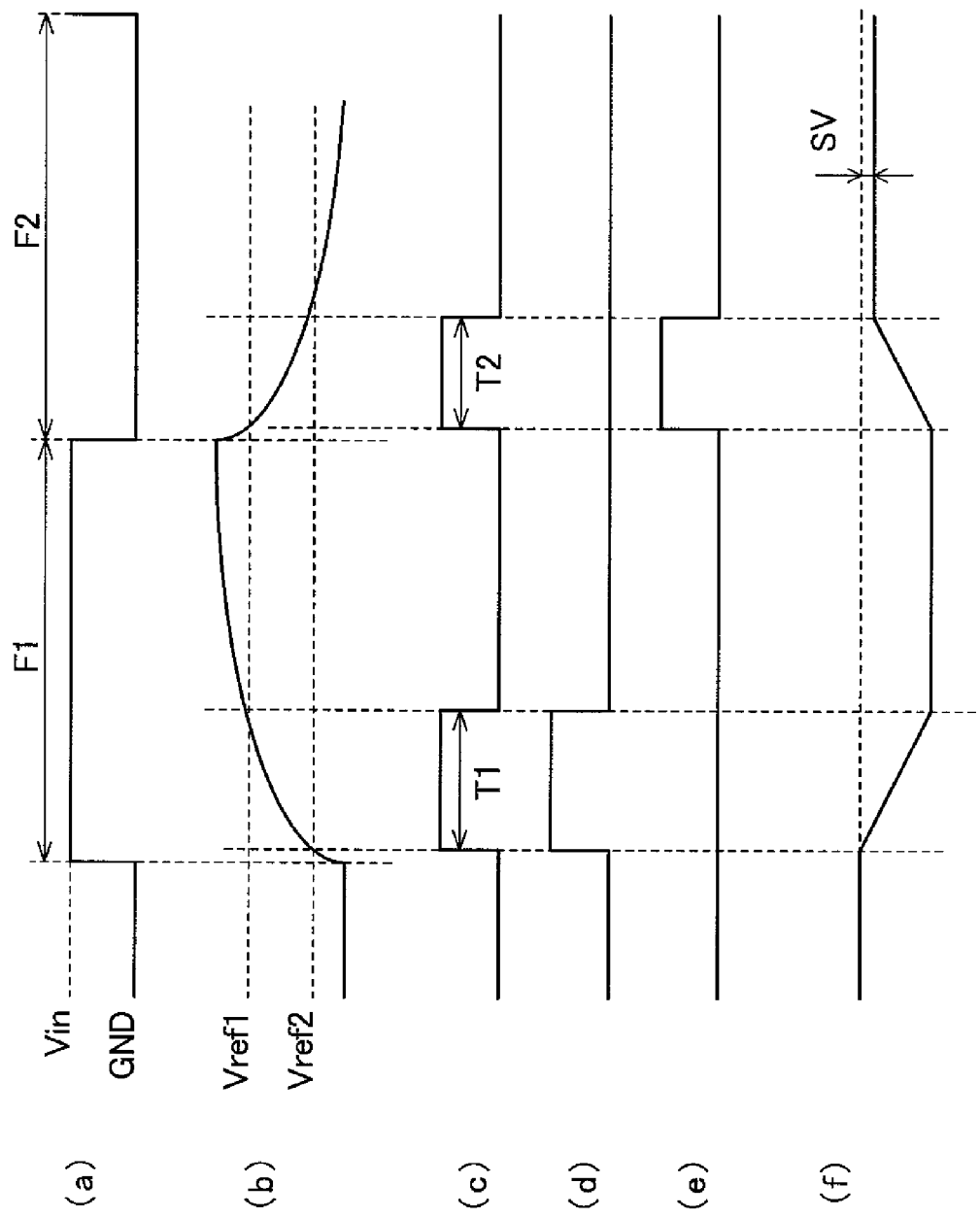
FIGS. 4A to 4F are timing diagrams showing voltage waveforms of portions shown in FIG. 3.

The rise time during which when a pulse voltage that varies from the reference voltage GND to the voltage Vin is supplied to the resistor R2 in the circuit configuration shown in FIG. 2D, the pulse voltage rises from the predetermined voltage Vref1 to the predetermined voltage Vref2 is identical to a fall time during which when the capacitance C in a state of being charged up to the voltage Vin supplies a pulse voltage that varies from the voltage Vin to the reference voltage GND to the resistor R2, the pulse voltage falls from the predetermined voltage Vref2 to the predetermined voltage Vref1. In FIG. 4, therefore, the pulse voltage that varies from the voltage Vin to the reference voltage GND is supplied to the corner 4 of the light shielding film BM.

The comparator circuit 16 converts the pulse voltage that is output from the corner 4 of the light shielding film BM and falls at the predetermined time constant into a signal having a second time duration (T2 in FIG. 4C).

With the signal having the second time duration, the switch 29 of the charge pump circuit 22 is turned on (refer to FIG. 4E), and a current of a current source 30 is output to the integrator circuit 31. Thus, according to the time duration (T2 in FIG. 4C) of the signal having the second time duration, charge is released from the capacitor 33 of the integrator circuit 31. When the time duration of the signal having the second time duration is long, the amount of charge is large. When the time duration is short, the amount of charge is small.

After the above-described procedure is followed, an output voltage SV (refer to FIG. 4F) of the integrator circuit 31 is converted into a digital value by the A/D converter 35.

When the output of the integrator circuit 31 is a voltage of negative polarity, it means that the observer's finger that touches the light shielding film BM lies near the corner 4. In contrast, when the output of the integrator circuit 31 is a voltage of positive polarity, it means that the observer's finger lies near the corner 3. When the output is zero, it means that the observer's finger touches a point whose distances from the corners 3 and 4 respectively are nearly equal to each other.

Accordingly, the output voltage of the integrator circuit 31 represents the relationship between the distances of the observer's finger from the corners 3 and 4 of the light shielding film BM. Therefore, when the output voltage is converted into a digital form, the coordinates representing the point touched by the finger between the corners 3 and 4 can be obtained.

Next, after a switch 34 of the integrator circuit 31 is turned on, and the capacitor 33 is reset, a pulse voltage is applied to each of the corners 5 and 6 of the light shielding film BM as described above. A pulse voltage that rises at a predetermined time constant and develops at the other diagonal corner or a pulse voltage that falls at a predetermined time constant is converted into a signal having a time duration. According to the same method as described above, coordinates representing a point touched by an observer's finger can be obtained between the corners 5 and 6. Thus, the position touched by the observer's finger can be identified on the touch panel.

When the output voltage of the integrator circuit 31 is converted into a digital form by the A/D converter 35, the operations shown in FIGS. 4A to 4F may be repeated more than once to increase the voltage of the integrator circuit 31. Thereafter, the voltage may be converted into a digital form by the A/D converter 35.

Moreover, two sets of the buffer amplifier 15, the comparator circuit 16, the charge pump circuit 22, and the integrator circuit 31 may be prepared so that one set will be associate with the corners 3 and 4, and the other set will be associated with the corners 5 and 6.

As described above, in the embodiment, since a pulse voltage is alternately applied to the diagonal corners of the light shielding film BM, noise generated on the light shielding film BM can be canceled. Thus, a touch panel unsusceptible to noise can be realized. Especially when the invention is applied to a display device having an input function integrated into a liquid crystal display panel or an electroluminescence (EL) panel, the input function unsusceptible to noise generated by the liquid crystal display panel or the EL panel can be realized.

Since the embodiment can be configured easily with a switch circuit, a comparator, a charge pump, and an integrator circuit, the cost can be reduced.

In the embodiment, since the resistance value of the light shielding film BM having a grid pattern can be increased equivalently, a time constant can be made large. This increases the delay time, thereby being able to improve sensitivity.

Also in the embodiment, a touch panel prepared on another substrate separate from the liquid crystal display panel is not stacked, but the conductive light shielding film of the color filter substrate in the liquid crystal display panel is used as an electrode for touch panel. Therefore, it is possible to make the liquid crystal display panel thin compared with the case of attaching another substrate for touch panel.

Figure 5:
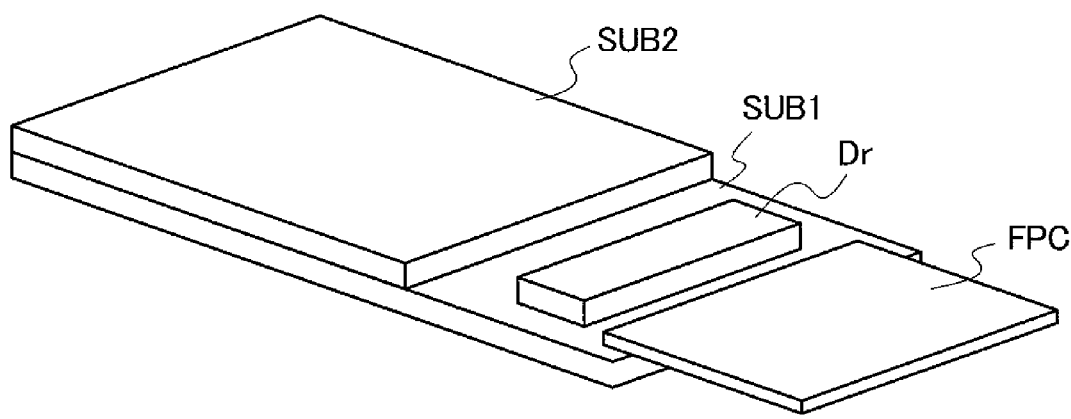
FIG. 5 is a block diagram showing an exemplary schematic configuration of the liquid crystal display panel incorporating the touch panel according to the embodiment of the invention.

FIG. 5 is a block diagram showing an exemplary schematic configuration of the liquid crystal display panel incorporating the touch panel according to the embodiment. The liquid crystal display panel incorporating the touch panel shown in FIG. 5 is a small liquid crystal display module used as a display portion of mobile phone, digital camera, or the like.

The liquid crystal display panel shown in FIG. 5 is formed as follows: the first substrate SUB1 on which pixel electrodes, thin film transistors, and the like are provided and the second substrate SUB2 on which color filters and the like are formed are overlapped with each other with a predetermined gap; the substrates are bonded together with a sealing material made of an epoxy resin and formed in a frame shape near the periphery of the substrates; liquid crystal is filled and sealed inside the sealing material between the substrates from a liquid crystal filling port provided at a part of the sealing material; and a polarizer is attached to the outer surfaces of the substrates.

The first substrate SUB1 has a larger area than that of the second substrate SUB2. On a region of the first substrate SUB1 not facing the second substrate SUB2, a semiconductor chip Dr constituting a driver that drives the thin film transistors is mounted. Further, a flexible wiring board FPC is mounted on the periphery of the region on one side.

Figure 6:
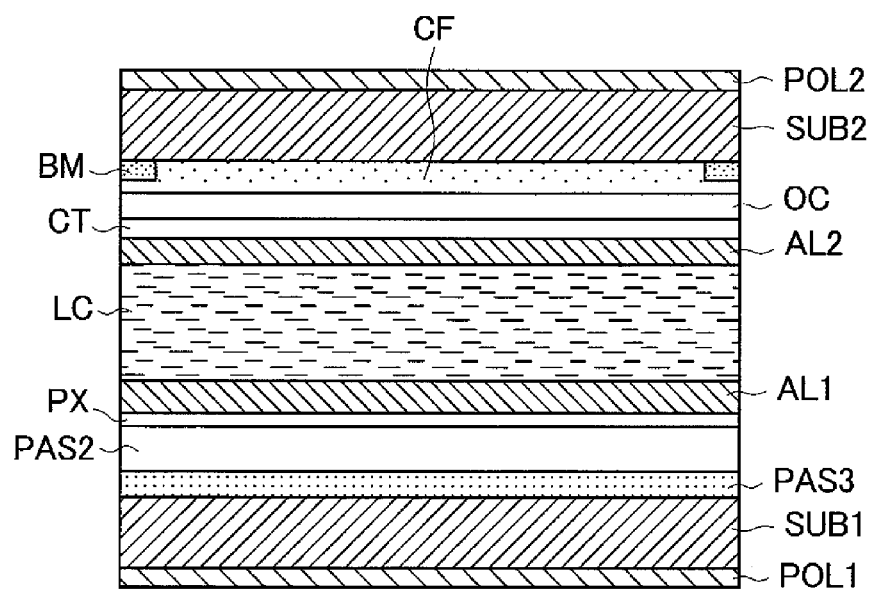
FIG. 6 is a cross-sectional view showing a cross sectional structure of one sub-pixel of the liquid crystal display panel shown in FIG. 5.

FIG. 6 is a cross-sectional view showing a cross sectional structure of one sub-pixel of the liquid crystal display panel shown in FIG. 5. The liquid crystal display panel shown in FIG. 6 is a liquid crystal display panel of vertical electric field system, in which the main surface side of the second substrate SUB2 is an observer side.

On a liquid crystal layer LC side of the second substrate SUB2 formed of a transparent substrate such as a glass substrate or a plastic substrate, the light shielding film BM and a color filter CF, an overcoat layer OC, a planar counter electrode CT, and an alignment film AL2 made of a polyimide resin are formed in this order from the second substrate SUB2 to the liquid crystal layer LC. Further, a polarizer POL2 is formed on the outer surface of the second substrate SUB2.

On the liquid crystal layer LC side of the first substrate SUB1 formed of a transparent substrate such as a glass substrate or a plastic substrate, a scanning line (also referred to as gate line) GL (not shown), an inter-layer insulating film PAS3, a video line (also referred to as drain line or source line) DL (not shown), an inter-layer insulating film PAS2, a pixel electrode PX, and an alignment film AL1 made of a polyimide resin are formed in this order from the first substrate SUB1 to the liquid crystal layer LC. Further, a polarizer POL1 is formed on the outer surface of the first substrate SUB1.

In the liquid crystal display panel shown in FIG. 6, the light shielding film BM is formed of a material such as, for example, chromium to impart conductivity to the light shielding film BM. The light shielding film BM is also used as a touch panel electrode of electrostatic capacitive coupling system, so that a touch panel function is realized. In the configuration of FIG. 6, the polarizer POL2 is disposed on the second substrate SUB2. In the case where the polarizer POL2 is insulative, when the observer's finger touches the polarizer POL2, the observer's finger may not function as a capacitance. In such a case, a polarizer having conductivity may be used as the polarizer POL2.

The touch position detection circuit including the pulse voltage generating circuit 2, the switches 7 to 14, the buffer amplifier 15, the comparator circuit 16, the charge pump circuit 22, the integrator circuit 31, and the A/D converter 35, shown in FIG. 3, may be mounted in the semiconductor chip Dr shown in FIG. 5, or may be disposed to the outside (main body side of mobile phone, in this case).

As described above, in the embodiment, a touch panel prepared on another substrate separate from the liquid crystal display panel is not stacked, but the light shielding film BM on the second substrate SUB2 of the liquid crystal display panel is used as a touch panel electrode of electrostatic capacitive coupling system. Therefore, it is possible to make the liquid crystal display panel thin compared with the case of bonding another sensor substrate.

The bonding accuracy of the second substrate SUB2 and the first substrate SUB1 is generally as high as ±10 µm or less. When another sensor substrate is bonded to the liquid crystal display panel, there are techniques of outer-shape alignment or mark alignment. The outer-shape alignment has poor accuracy because it depends on the accuracy of outer shape. The mark alignment requires not only the provision of a mark in a product but also a mark reader, which increases the cost for the device.

In contrast, in the embodiment, the liquid crystal display panel can be made thin by using an existent device without the necessity of additional equipment.

Next, a method of leading out wires for touch panel from the four corners of the light shielding film BM in the liquid crystal display panel according to the embodiment will be described.

Figure 7:
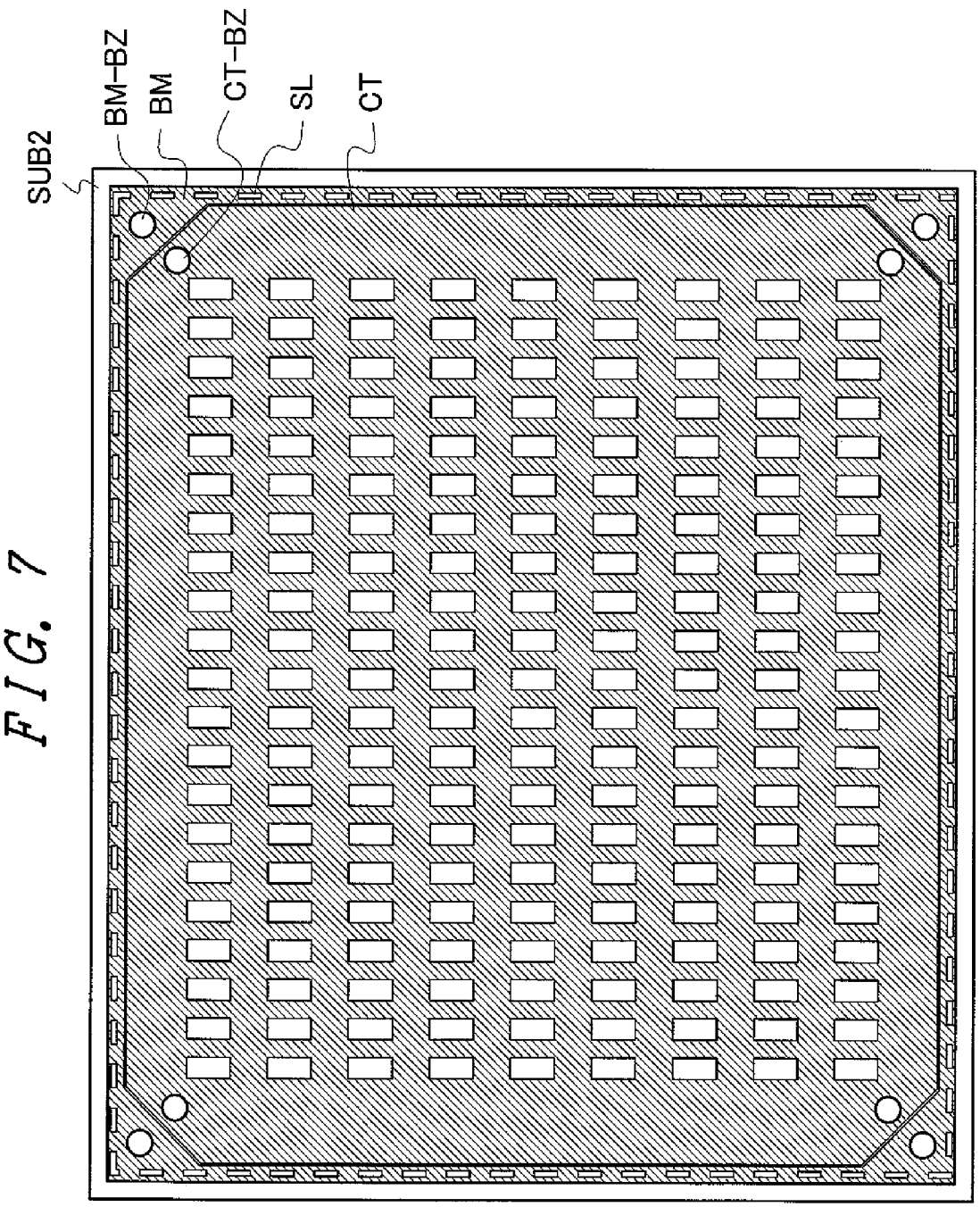
FIG. 7 is a plan view of a second substrate according to the embodiment of the invention as viewed from a liquid crystal layer side.

FIG. 7 is a plan view of the second substrate SUB2 as viewed from the liquid crystal layer LC side. As shown in FIG. 7, a conductive bead CT-BZ is disposed at each of the four corners of the counter electrode CT on the second substrate SUB2. A conductive bead BM-BZ is disposed at each of the four corners of the light shielding film BM.

Figure 8:
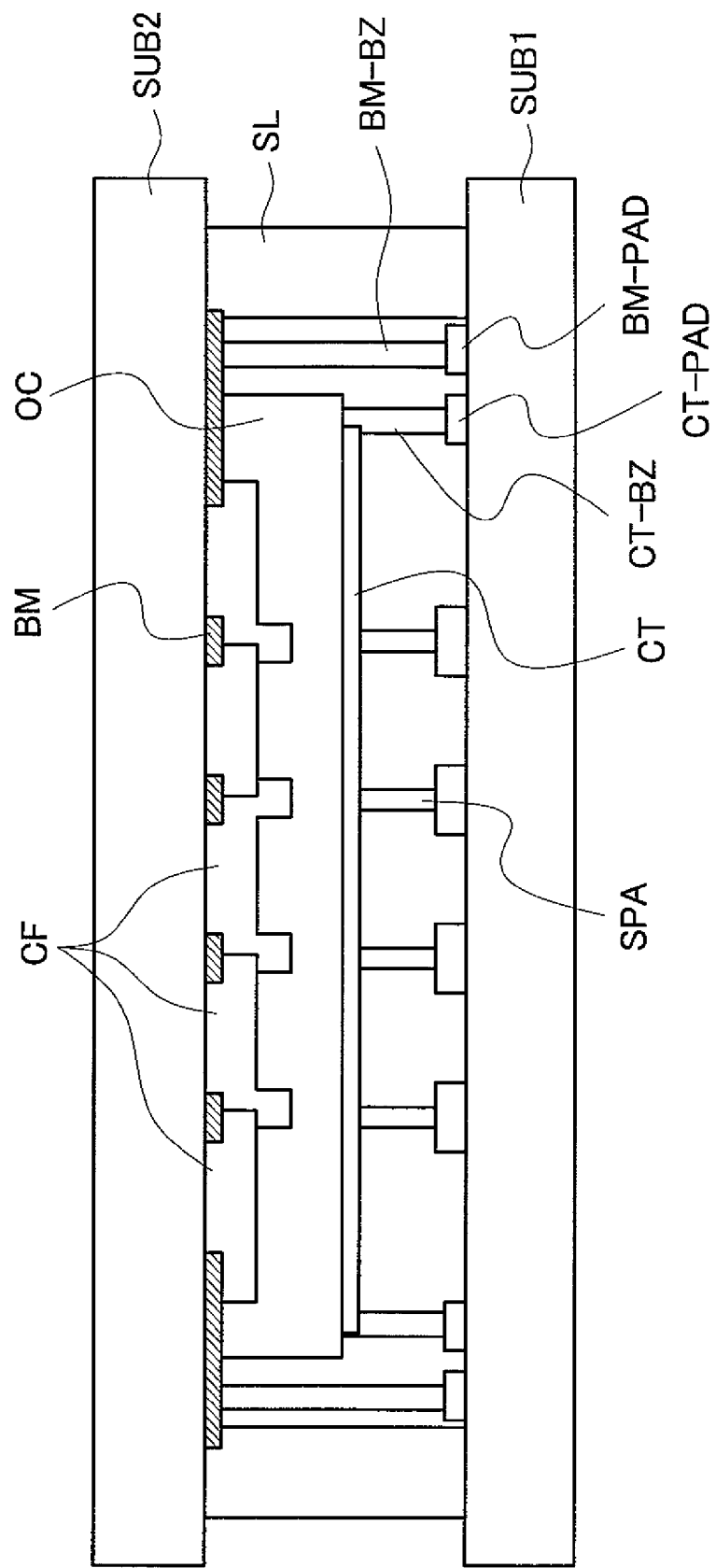
FIG. 8 is a schematic cross-sectional view showing a cross sectional structure of the liquid crystal display panel according to the embodiment of the invention.

FIG. 8 is a schematic cross-sectional view showing a cross sectional structure of the liquid crystal display panel according to the embodiment. In FIG. 8, the illustration of the configuration on the first substrate SUB1 side is omitted. The illustration of the alignment film AL2 on the second substrate SUB2 side is omitted. Further, the illustration of the polarizers POL1 and POL2 disposed on the outer surfaces of the substrates is omitted.

As shown in FIG. 8, in the embodiment, connecting portions CT-PAD for counter electrode are disposed on the first substrate SUB1. Similarly, connecting portions BM-PAD for light shielding film are disposed.

The connecting portion CT-PAD for counter electrode is electrically connected to the counter electrode CT via the conductive bead CT-BZ. The connecting portion BM-PAD for light shielding film is electrically connected to the light shielding film BM via the conductive bead BM-BZ.

In the schematic view of FIG. 8, the conductive beads CT-BZ and BM-BZ having a column shape are illustrated. The conductive beads CT-BZ and BM-BZ are formed by plating nickel and gold on the surface of resin spheres. In FIG. 8, SP denotes a spacer, and SL denotes a sealing material.

A counter voltage is supplied from the semiconductor chip Dr to the connecting portions CT-PAD for counter electrode formed on the first substrate SUB1.

The connecting portions BM-PAD for light shielding film formed on the first substrate SUB1 are connected to the switches 7 to 14.

Figure 9:
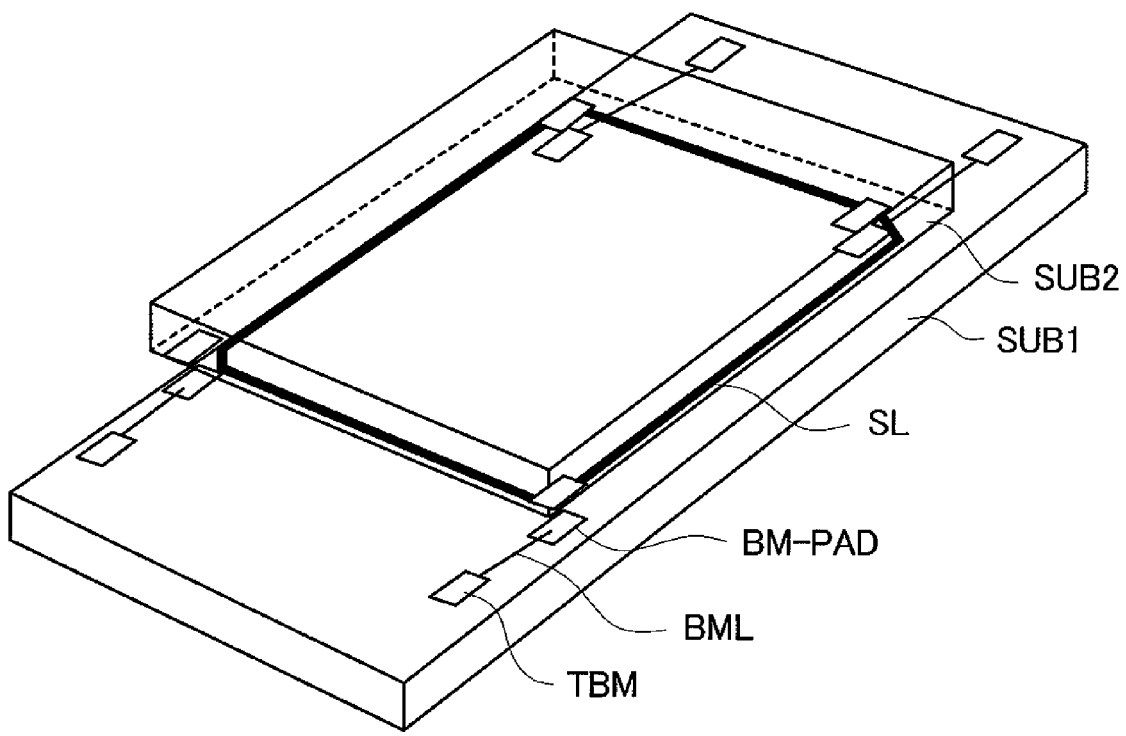
FIG. 9 is an exemplary view showing a structure for leading out wires for touch panel in the liquid crystal display panel according to the embodiment of the invention.
Figure 10:
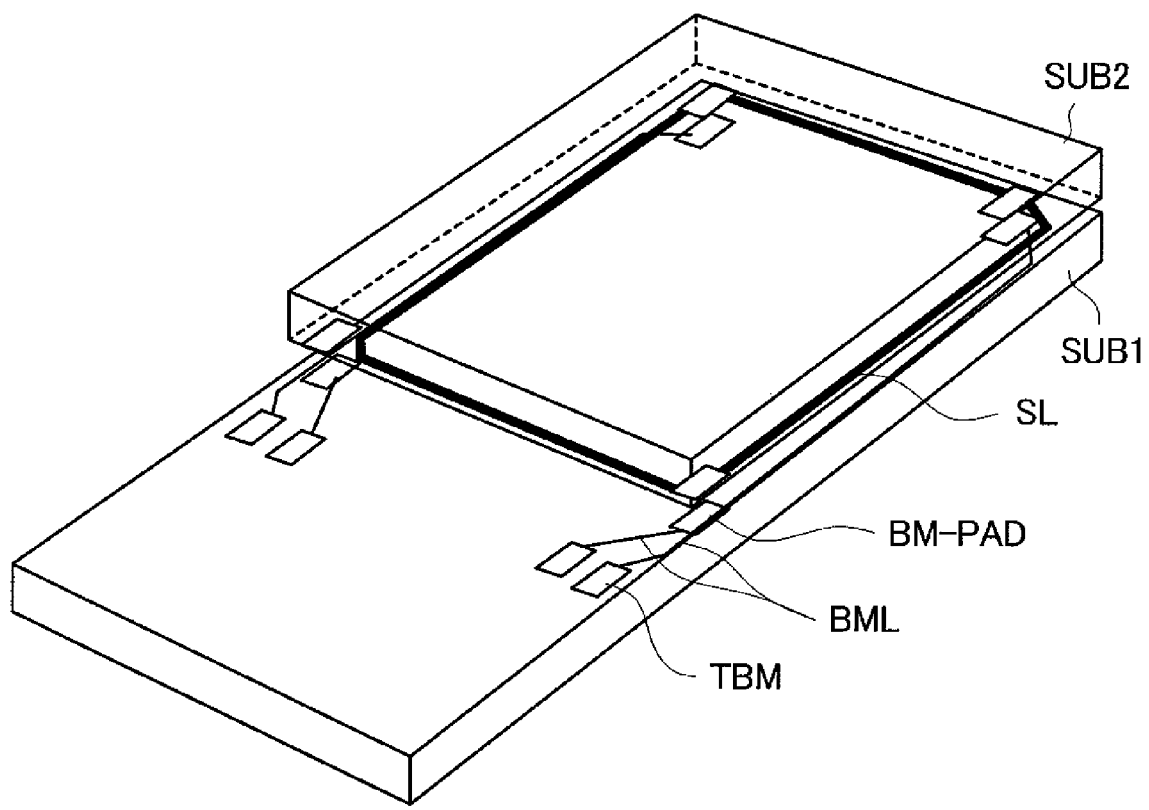
FIG. 10 is an exemplary view showing another structure for leading out wires for touch panel in the liquid crystal display panel according to the embodiment of the invention.

As shown in FIGS. 9 and 10, each of the connecting portions BM-PAD for light shielding film formed on the first substrate SUB1 is connected to a terminal TBM formed on the first substrate SUB1 via a wire BML.

The terminal TBM is connected to the touch position detection circuit in the semiconductor chip Dr, or to the external touch position detection circuit via the flexible wiring board FPC or a substrate for touch panel (not shown).

FIG. 9 shows the terminals TBM when they are disposed on both sides with the display portion interposed therebetween. FIG. 10 shows the terminals TBM when they are collected on any one side of the first substrate SUB1.

As shown in FIG. 10, when the terminals TBM are collected on one side of the first substrate SUB1, the wire resistances of the wires BML connected to the four connecting portions BM-PAD for light shielding film formed on the first substrate SUB1 are different from one another.

Therefore, the wires BML connected to two of the connecting portions BM-PAD for light shielding film near the one side are preferably adjusted so as to have an equal resistance to that of the wires BML connected to the other two connecting portions BM-PAD for light shielding film remote from the one side by making the wire width thereof thinner, forming the wire in a meandering manner to be longer, or using a high resistance material for the middle of the wire.

When the wire BML crosses the sealing material SL for sealing, a material used on the first substrate (for example, glass substrate) is used for a portion of the wire BML that overlaps the sealing material SL, so that disconnection failure can be reduced. In the case of the embodiment, it may be formed of a stacked film of a Mo alloy and an Al alloy that forms scanning electrode wires.

Next, a method for manufacturing the liquid crystal display panel according to the embodiment will be described.

First, a method for manufacturing the first substrate SUB1 will be described.

An Al alloy is stacked to a thickness of 200 nm on a transparent substrate (for example, glass substrate), and a Mo alloy is stacked thereon to a thickness of 40 nm, by a sputtering method. A desired resist mask pattern is formed above the substrate by using a photolithography method. After etching with a mixed acid of phosphoric acid, nitric acid, and acetic acid, the resist pattern is peeled off. At this time, scanning lines, counter electrode wires, and wires for connection with the light shielding film BM are formed.

A silicon nitride film, amorphous silicon, and an amorphous silicon layer doped with phosphorus are stacked in this order from the bottom to a thickness of 350 nm, 200 nm, and 25 nm, respectively, above the substrate by using a chemical vapor deposition method (hereinafter simply referred to as CVD). After a desired resist pattern is formed by a photolithography method, the amorphous silicon doped with phosphorus and the amorphous silicon are selectively processed collectively by a dry etching method using a fluorine gas, so that the resist pattern is removed by peeling. At this time, the thin film transistors (TFT) are formed.

A Mo alloy is deposited to a thickness of 200 nm above the substrate by a sputtering method. A desired resist pattern is formed by a photolithography method. After etching with a mixed acid of phosphoric acid, nitric acid, and acetic acid, the resist pattern is peeled off. At this time, video lines and source electrodes are formed.

A silicon nitride film is deposited to a thickness of 500 nm above the substrate by using a CVD method. After forming a desired resist pattern by a photolithography method, the silicon nitride film is patterned by a dry etching method using fluorine gas. At this time, contact holes for connection with pixel electrodes that are formed on the source electrodes in a next step, contact holes of terminal portions of the scanning lines and the video lines, and contact holes for connection with a counter electrode are formed.

An ITO film is deposited to a thickness of 150 nm above the substrate by using a sputtering method. After forming a desired resist pattern by a photolithography method, the resist pattern is wet-etched by using hydrobromic acid, thereby being removed by peeling. At this time, an ITO pattern is formed for each of the pixel electrodes, the terminal portions, and the connecting portions with the color filter substrate.

Next, a method for manufacturing the color filter substrate to be manufactured in parallel in a separate process will be described.

A chromium film is deposited to a thickness of 200 nm on a transparent substrate (for example, glass substrate) by a sputtering method. After forming a desired resist pattern by a photolithography method, the resist pattern is wet-etched with a di-ammonium cerium nitrate solution to be removed by peeling, so that the light shielding film BM is formed. At this time, when chromium oxide is deposited on a glass surface side to be stacked on chromium metal, display quality can be improved because chromium oxide having a low reflectivity faces an observer. In addition, the process can be performed by one etching. By adjusting the film thickness of the stacked chromium metal, the film having any desired sheet resistance can be formed.

The color filters CF for red, blue, and green are formed into a desired pattern above the substrate by using a photolithography method. It is desirable that the color filters CF have substantially the same thickness.

An overcoat film OC made of an acrylic resin is applied above the substrate. By applying the overcoat film OC, the thickness difference between the color filters CF, the level difference of the portion overlapped with the light shielding film BM, and the level difference due to the overlap between the color filters CF can be reduced.

The ITO film is deposited to a thickness of 150 nm above the substrate by a sputtering method to form the counter electrode CT. At the time of deposition, a metal mask is disposed near the surface of the substrate so as to cover the periphery of the pattern. This can provide the counter electrode CT in a region necessary for display without electrically connecting with the light shielding film BM made of chromium and without increasing the number of steps. It is self-obvious that the same effect can be provided when the pattern formation of the ITO film is processed by a wet-etching method after forming the resist pattern. The spacers SP are formed above the substrate by using an acrylic resin. The height of the spacer is determined to a predetermined height based on the thickness of the liquid crystal layer LC interposed between the first substrate SUB1 and the color filter substrate.

Next, on the surfaces of the first substrate SUB1 and the second substrate SUB2 on the side where the liquid crystal is interposed, the alignment films AL1 and AL2 made of a polyimide resin are applied, baked and cured, and then rubbed so as to have liquid crystal alignment property.

The sealing material SL for sealing is applied above the first substrate SUB1. A sealing material including the conductive beads CT-BZ and BM-BZ is applied to the connecting portion with the second substrate SUB2 at corner portions.

The first substrate SUB1 with the film surface facing upward is placed on a level stage. A predetermined amount of liquid crystal is dropped in the region surrounded by the sealing material SL for sealing. The second substrate SUB2 with the film surface facing downward is overlapped with the first substrate SUB1 in a vacuum atmosphere.

The sealing material SL for sealing and the sealing material including the conductive beads are cured.

A step of cutting the substrates into individual panel outer shapes, and the like are followed, but they are omitted.

As described above, no step is added to the conventional manufacture of liquid crystal display panel in view of process, but only the number of times of applying the sealing material including the conductive bead BM-BZ is increased. Accordingly, in the embodiment, the touch panel function can be incorporated into the liquid crystal display panel without increasing the number of steps.

In the liquid crystal display panel according to the embodiment, after the first substrate SUB1 and the second substrate SUB2 are bonded together with the sealing material SL for sealing, at least one glass surface of the substrates is mechanically or chemically polished, so that the liquid crystal display panel can be easily made thinner.

In polishing, in the case where the second substrate SUB2 side is more polished and made thinner, a capacitive coupling when the electrode for touch panel is touched is increased, which contributes to an improvement in characteristics of the touch panel.

In the above description, the wire for touch panel is led out from the first substrate SUB1 side. However when the second substrate SUB2 is cut larger than the first substrate SUB1, and the wire is led out from the second substrate SUB2 side, the same effect can be provided.

In the embodiment, the shape and structure of the connecting portions that connect the first substrate SUB1 with the second substrate SUB2 are not limited to those shown in the drawings. Further in the embodiment, chromium is used as the constituent material of the light shielding film BM, but other metal materials can also provide the same effect. When the light shielding film BM formed by stacking a light shielding material and a conductive material is used, the same effect can also be provided.

As described above, according to the embodiment, in a device combining a touch panel of electrostatic capacitive coupling system with a display device of image information and character information, a thin product can be produced without increasing the number of steps.

Figure 11:
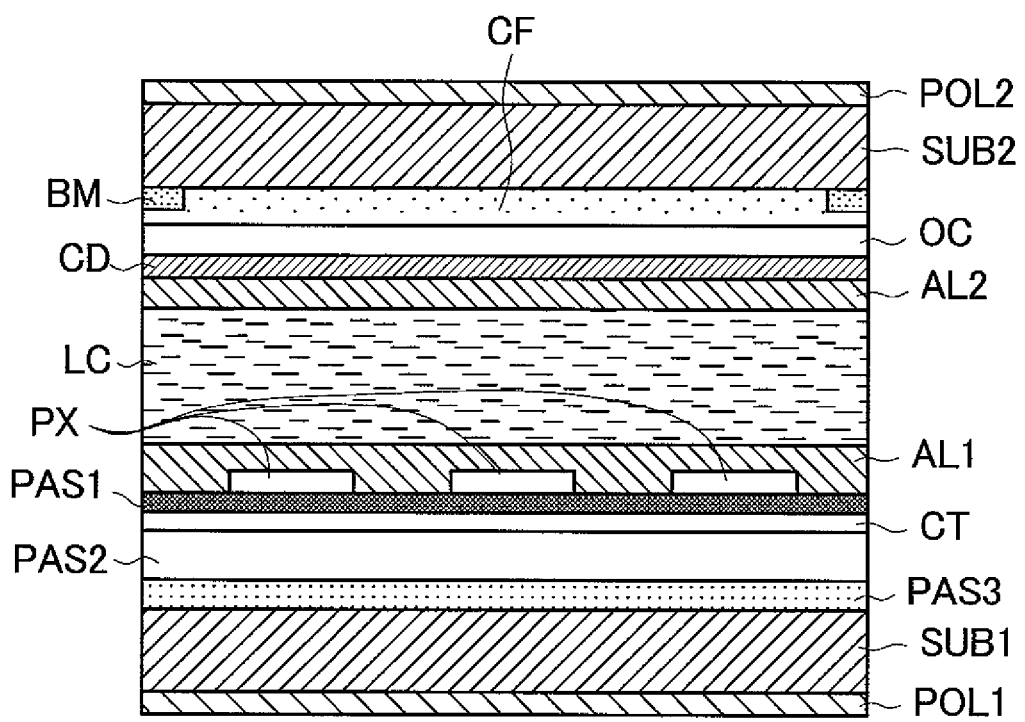
FIG. 11 is a cross-sectional view showing a cross sectional structure of one sub-pixel of another example of the liquid crystal display panel according to the embodiment of the invention.

While the above description describes the case where the touch panel is incorporated into the liquid crystal display panel of vertical electric field system, it is also possible in the invention to incorporate the touch panel into a liquid crystal display panel of lateral electric field system. FIG. 11 shows a cross sectional structure of one sub-pixel of a liquid crystal display panel in that case. Also in the liquid crystal display panel shown in FIG. 11, the main surface side of the second substrate SUB2 is the observer side.

On the liquid crystal layer LC side of the second substrate SUB2 formed of a transparent substrate such as a glass substrate or a plastic substrate, the light shielding film BM and the color filter CF, the overcoat layer OC, a planar transparent conductive film CD, and the alignment film AL2 made of a polyimide resin are formed in this order from the second substrate SUB2 to the liquid crystal layer LC. Further, the polarizer POL2 is formed on the outer surface of the second substrate SUB2. In this case, the planar transparent conductive film CD is used as a shield electrode that blocks noise generated by the liquid crystal display panel.

On the liquid crystal layer LC side of the first substrate SUB1 formed of a transparent substrate such as a glass substrate or a plastic substrate, the scanning line (also referred to as gate line) GL (not shown), the inter-layer insulating film PAS3, the video line (also referred to as drain line or source line) DL (not shown), the inter-layer insulating film PAS2, the planar counter electrode CT, an inter-layer insulating film PAS1, the pixel electrode PX formed of a comb-teeth electrode, and the alignment film AL1 are formed in this order from the first substrate SUB1 to the liquid crystal layer LC. Further, the polarizer POL1 is formed on the outer surface of the first substrate SUB1.

While the above description is given of the embodiment using the liquid crystal display panel, the invention is not limited thereto. The invention can also use a panel using an organic light emitting diode element or a surface-conduction electron-emitter in addition to the liquid crystal display panel.

While the invention made by the inventor has been specifically described based on the embodiment, the invention is not limited to the embodiment. It is apparent that the invention can be modified in various ways without departing from the gist thereof.

What is claimed is:

1. A display device comprising:
a display panel having a first substrate and a second substrate, the second substrate having a conductive light shielding film formed in a grid pattern;
a pulse-voltage-for-position-detection generating circuit that inputs a pulse voltage for position detection; and
a coordinate position computing circuit that computes a touch position on the conductive light shielding film, wherein
the conductive light shielding film is used as a touch panel electrode of electrostatic capacitive coupling system,
the conductive light shielding film has a shape with four corners,
the pulse-voltage-for-position-detection generating circuit supplies the pulse voltage for position detection to each of the four corners of the conductive light shielding film at different timings, and
the coordinate position computing circuit computes a touch position on the conductive light shielding film based on a voltage output from, when the pulse voltage for position detection is supplied to one of the four corners of the conductive light shielding film, another corner on the same diagonal line as the corner to which the pulse voltage is supplied.

2. The display device according to claim 1, wherein
the pulse voltage for position detection includes a first pulse voltage changing from a first voltage level to a second voltage level and a second pulse voltage changing from the second voltage level to the first voltage level.

3. The display device according to claim 1, wherein
the coordinate position computing circuit has an integrator circuit, and
the integrator circuit integrates a current in a first period and discharges a current in a second period.

4. The display device according to claim 1, wherein
the coordinate position computing circuit has a first integrator circuit that integrates a current in a first period and discharges a current in a second period and a second integrator circuit that integrates a current in a third period and discharges a current in a fourth period.

5. The display device according to claim 1, wherein
the pulse-voltage-for-position-detection generating circuit supplies the pulse voltage for position detection more than once to each of the corners, and
the coordinate position computing circuit outputs a voltage that is obtained by adding voltages obtained by supplying the pulse voltage for position detection more than once.

6. The display device according to claim 1, wherein
the coordinate position computing circuit has an integrator circuit and an A/D conversion circuit connected at the later stage of the integrator circuit.

7. A display device comprising:
a display panel having a first substrate and a second substrate, the second substrate having a conductive light shielding film formed in a grid pattern;
a pulse-voltage-for-position-detection generating circuit that inputs a pulse voltage for position detection; and
a coordinate position computing circuit that computes a touch position on the conductive light shielding film, wherein
the conductive light shielding film is used as a touch panel electrode of electrostatic capacitive coupling system,
the conductive light shielding film has a shape with four corners,
the pulse-voltage-for-position-detection generating circuit supplies the pulse voltage to the four corners of the conductive light shielding film, and
the coordinate position computing circuit computes a touch position on the conductive light shielding film based on a voltage output from, when the pulse voltage for position detection is supplied to a first corner of the conductive light shielding film, a second corner positioned on a diagonal line with respect to the first corner and on a voltage output from, when the pulse voltage for position detection is supplied to a third corner of the conductive light shielding film, a fourth corner positioned on a diagonal line with respect to the third corner.

8. The display device according to claim 7, wherein
the coordinate position computing circuit computes a touch position based on a first time difference between a first time in which the voltage output from the second corner when the pulse voltage for position detection is supplied to the first corner becomes a predetermined voltage and a second time in which the voltage output from the first corner when the pulse voltage for position detection is supplied to the second corner becomes a predetermined voltage and on a second time difference between a third time in which the voltage output from the fourth corner when the pulse voltage for position detection is supplied to the third corner of the conductive light shielding film becomes a predetermined voltage and a fourth time in which the voltage output from the third corner when the pulse voltage for position detection is supplied to the fourth corner becomes a predetermined voltage.

\* \* \* \* \*